United States Patent [19]

Pritzkow et al.

[11] Patent Number: 4,491,732
[45] Date of Patent: Jan. 1, 1985

[54] OPTICAL POTTING OF SOLID-STATE DETECTOR CELLS

[75] Inventors: Dennis H. Pritzkow, New Berlin; Neil W. Loomis, Muskego; Thomas M. Golner, Waukesha; David M. Hoffman, New Berlin, all of Wis.

[73] Assignee: General Electric Company, Milwaukee, Wis.

[21] Appl. No.: 411,419

[22] Filed: Aug. 25, 1982

[51] Int. Cl.³ .............................................. G01T 1/20
[52] U.S. Cl. ................................... 250/366; 250/367; 250/368; 250/370
[58] Field of Search ............... 250/370, 366, 367, 368, 250/363 S

[56] References Cited

U.S. PATENT DOCUMENTS

| | | | |
|---|---|---|---|
| 4,187,427 | 2/1980 | Cusano | 250/366 |
| 4,323,778 | 4/1982 | Wykes et al. | 250/368 |
| 4,417,144 | 11/1983 | Hoffman et al. | 250/367 |

Primary Examiner—Alfred E. Smith
Assistant Examiner—Carolyn E. Fields
Attorney, Agent, or Firm—Leydig, Voit, Osann, Mayer & Holt, Ltd.

[57] ABSTRACT

In a modular solid state detector of the type including a scintillator and diodes for converting x-ray flux to a measurable electrical signal, the diodes are mounted out of the path of incident x-radiation to minimize noise and to limit degradation. The resulting configuration reduces efficiency because the active diode area is limited and the length of the light path between the scintillator and diode is increased. In order to compensate for that reduction in efficiency, optical potting material is used to join the scintillator to the diodes in order to minimize light attenuation between those elements. In addition, the outer surface of the cured optical potting material is coated with a thin specular layer of silver to keep the light within the optical potting material and thus most efficiently reflected from the scintillator to the diode.

3 Claims, 4 Drawing Figures

OPTICAL POTTING OF SOLID-STATE DETECTOR CELLS

This invention relates to x-ray detectors and more particularly to the class of x-ray detectors which have come to be known as "solid state".

Detectors of this sort have an important use in CT scanners. In contrast to the early primative scanners using only one or a very small number (about 30) detectors, modern scanners incorporate hundreds of detector cells, attempt to pack them as tightly as practical to increase spatial resolution, and make them as efficient as practical in order to increase contrast resolution.

In spite of the fact that xenon detectors have met with a good measure of success in CT scanning, efforts are underway to produce high resolution solid state CT detectors. Among the benefits achievable by the solid state approach are a higher theoretical quantum detection efficiency. However, the approach does face certain problems not encountered with the xenon gas approach. The elements which produce the electrical signal in a solid state detector are typically photodiodes, and the active surfaces thereof are adversely effected by incident x-radiation. When x-radiation hits the active diode surface, it can cause noise rendering the reading then being taken inaccurate and, in the long run can degrade the diode itself. As a result, it is necessary to take reasonable precautions in protecting the active area of the diode from x-radiation.

A second factor to be considered is optical efficiency in coupling the light produced by the scintillator to the active surface of the diode with minimum attenuation. In that regard, it is desirable to maximize the active area of the diode and to associate that active area as closely as possible with the scintillator to maximize coupling.

Since the scintillator needs to be exposed to the radiation and it is preferable to protect the diode therefrom, those requirements tend to be self contradictory. In some approaches, the diode has been placed directly behind the scintillator in order to increase the area of the active surface and couple it as closely as possible to the scintillator. However, that approach can create problems in protecting the diode from x-radiation, because any radiation which penetrates the scintillator or bypasses it can fall on the diode.

Another approach is illustrated in Cusano U.S. Pat. No. 4,187,427 and also in Hoffman et al. co-pending application Ser. No. 236,738, now U.S. Pat. No. 4,417,144, entitled "Modular Solid State Detector Cell". The systems there described include a detector assembly which provides a shielded area near the detector window, and positions the sensing diodes in that shielded area. That approach has two problems with respect to efficiency in that the area of the diode surface must be reduced (from that considered above) and the diode is moved some distance from the scintillator, requiring a more tortuous optical path and therefore increased attenuation. Both of those detectors attempt to overcome these deficiencies by using the reflective detector cells, that is, presenting surfaces to light emitted by the scintillator which tend to reflect such light toward the remotely mounted but protected diodes. While there is little danger of exposing the diodes to radiation, optical efficiency is typically less than desired, and the approach can usually be used only with high light output scintillators such as CsI.

In view of the foregoing, it is an object of the present invention to provide a reflective cavity CT detector wherein the diodes are positioned out of the field of incident flux, but including means for enhancing optical transfer between the scintillator and diode.

Other objects and advantages will become apparent from the following detailed description when taken in conjunction with the drawings in which.

While the invention will be described in connection with certain preferred embodiments, there is no intent to limit it to those embodiments. On the contrary, the intent is to cover all alternatives, modifications and equivalents included within the spirit and scope of the invention as defined by the appended claims.

Reference is particularly made to the aforementioned Hoffman U.S. Pat. No. 4,417,144 which describes many of the mechanical features of a detector of which the present invention represents an improvement. The reader is referred to that application for additional detail on subsidiary features insofar as they relate to the present invention, and the disclosure thereof is incorporated here by reference.

Figure 1:
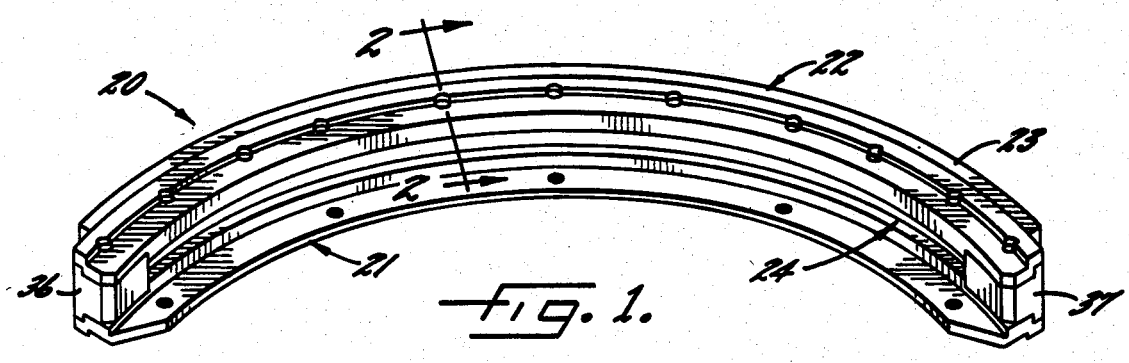
FIG. 1 is a perspective view showing a detector assembly useful for practice of the present invention.

Turning now to the drawings, FIG. 1 shows a detector assembly of the type particularly suited for use in a rotate-rotate CT scanner, which is the preferred geometry although the invention can be used with other types of CT detectors. The detector has a housing 20 which is arcuate in shape and which includes a pair of end members 21, 22 a rear wall 23 and a front window 24 enclosing a volume containing a plurality of detector cells. When disposed in a CT scanner, the detector array 20 is mounted opposite an x-ray source, with the focal spot of the source being located at the center of the detector arc. The x-ray source and detector are fixed with respect to each other so that fan beam swath of radiation produced by the source falls on the detector window 24 to produce a plurality of electrical signals, one from each detector cell within the detector assembly. The source-detector assembly is rotated about a patient aperture to produce a large number of x-ray readings which are transmitted to the reconstruction computer which computes the CT image.

Figure 2:
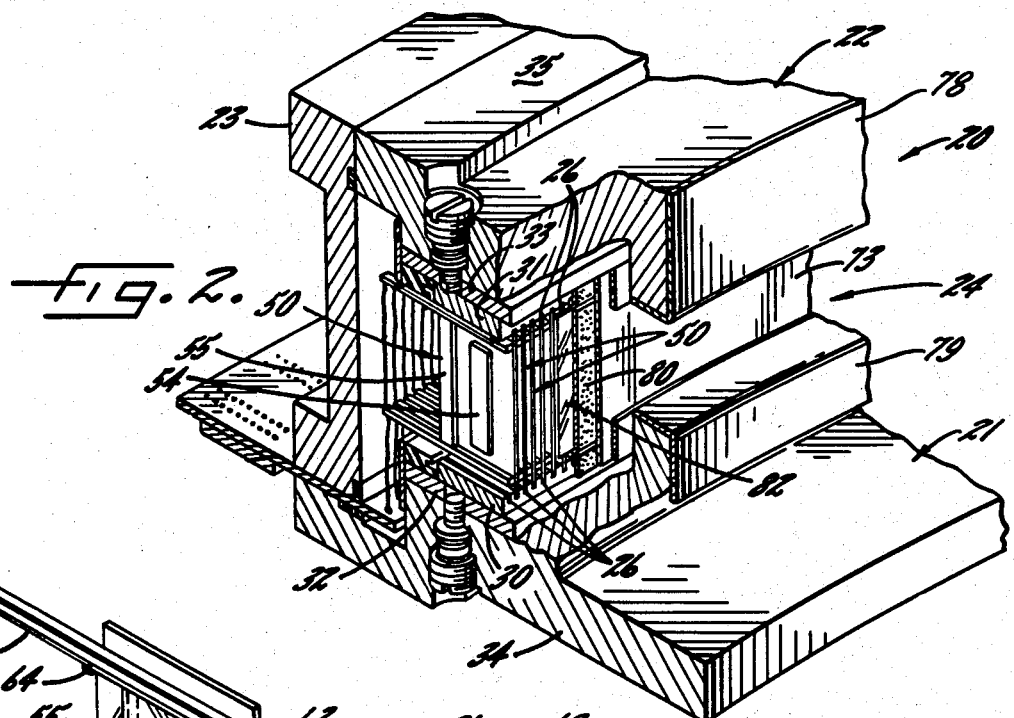
FIG. 2 is a partial sectional view taken along the line 2—2 of FIG. 1.

As best shown in FIG. 2, each of the end members 21, 22 of the housing 20 is a composite assembly having a plurality of slots 26 for receiving the detector cell assembly to be described below. The slots are aligned with the x-ray source, so that with the unit cells in place, a plurality of detector cells are created which measure incident radiation in small increments over the detector arc. Arcuate machinable glass ceramic sections 30, 31, preferably of Macor (trademark designation of Corning Glass Works for a machinable glass ceramic), have precision machined therein a plurality of slots 26 which establish the cell position and the spacing for each of the cells in the detector array. The machined sections can be bonded to mounting substrates 32, 33 which in turn can be bolted as shown to end members 34, 35.

Figure 3:
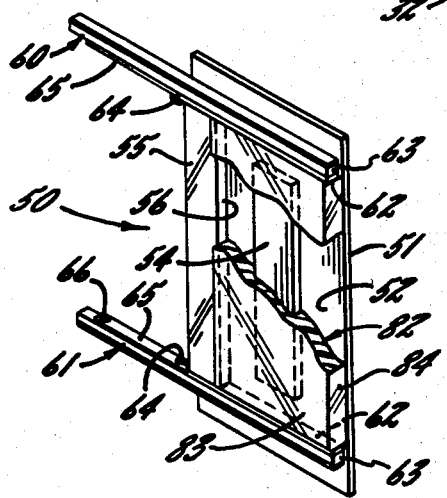
FIG. 3 is a perspective view showing the elements for a single detector cell.

Attention is directed to FIG. 3 which illustrates one of the detector cells 50. It is seen that the cell is formed on a base plate 51 of high density material such as tungsten to serve as a collimator for the cell. Bonded to the face 52 of the plate 51 is a scintillator body 54 mounted with its long axis parallel to the forward edge of the plate 51. X-radiation falling on the cell is absorbed by the scintillator which produces light in proportion to the amount of x-radiation absorbed. The presently preferred scintillator material is CsI because of its moderate to high light output. However, other scintillator materials can also be used.

In the reflective cavity environment, the tungsten plate 51 is first polished and then surfaced coated at least on face 52 with a highly reflective material. It is presently preferred to apply a thin layer of silver by evaporative or sputter coating techniques, following which a protective coating of magnesium floride is applied. To prevent light from escaping to the rear of the cell and for reflecting it back into the cell, a reflective bar 55 is positioned generally parallel to the scintillator and to the rear edge of the plate. Although the bar can be of metal, it is preferred to use boro silicate glass, and to deposit on the face 56 a reflective aluminum coating.

In practicing the invention, photoresponsive means are associated with the scintillator but positioned on the plate in a location where they will be protected from incident flux when the plate is assembled in a detector. To that end a pair of PIN photodiode assemblies 60, 61 precisely positioned with respect to the other elements and bonded to the plate 51 convert the light generated by the scintillator 54 into a measurable electrical signal. The active diode sensing surface, indicated at 62, substantially covers the entire end of the associated reflective cell. The active diode element is bonded by means of conductive epoxy to a substrate 63 which is preferably a ceramic material having a coefficient of thermal expansion very near that of the tungsten plate. A pair of wire leads 64 connect the active diode element to a printed circuit conductor 65 having mounting pads 66 for attachment of wires to connect the unit cell to the remaining CT electronics.

Figure 4:
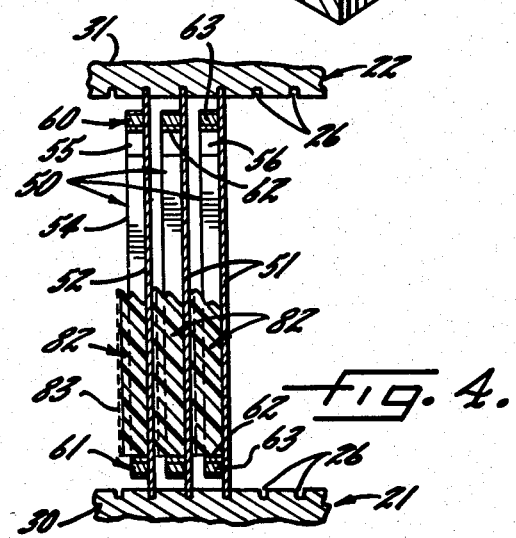
FIG. 4 is a view showing a plurality of juxtaposed cells.

FIG. 4 shows a plurality of cells associated with the slotted mounting substrate, illustrating the cell aperture and the relationship between the scintillators and their associated diodes. It is seen that x-ray flux is incident on the scintillators (into the paper), and the scintillators thereupon create light which must be reflected upwardly and downwardly to the diode active surfaces where an electrical signal proportional to incident flux is created. The face 52 of the plate as well as the rear wall 55 are reflective, tending to reflect escaping light to the diodes. FIG. 2 also shows a front window including a graphite impregnated fiberglas outer layer 73, a resilient material 80 for enhancing light sealing and a reflective Mylar (registered trademark of E. I. Du Pont de Nemours & Company for plastic films) element 82 for providing a reflective surface at the entrance of the cell.

FIG. 2 also shows a pair of lead shields 78, 79 affixed to the top and bottom members 21, 22 to define the window 24. It is seen with the window defined in that fashion, the diodes 60, 61 are protected from the swath of incident x-radiation thereby to avoid the problems detailed above.

In accordance with the invention, means are associated with the structure thus far described to enhance the travel of light from the scintillator 54 to the more or less remotely located but protected diodes 60, 61. As best shown in FIGS. 3 and 4 the entire cell area from the rear plate 55 to the front edge of the plate 51 is potted with material 82 intended to enhance light coupling between the scintillator and diode. The potting material is selected to have an index of refraction as close as practical to that of the scintillator and the diode.

There are a number of materials which can be used as potting material according to the present invention. Emerson and Corning Eccosil 2CN is a two component room temperature cure silicon rubber compound which is suitable. The cured material has an index of refraction of about 1.40 and is a relatively soft rubber (22 Shore A). Other materials with similar characteristics are RTV 602 and RTV 615 silicon rubber products produced by General Electric.

A second class of suitable material is represented by Emerson and Corning's Stycast 1266 and 1267 which represent a series of clear epoxy potting compounds. These materials are two part room temperature cure epoxies. The cured material has a refractive index of about 1.56 and is significantly harder than the silicon rubber (75 Shore D). The light transmittance as a function of wave length is shown in the following table:

| Wavelength of Incident Light | Percent Transmittance |
|---|---|
| 700 nm | 90% |
| 600 nm | 85% |
| 500 nm | 75% |
| 400 nm | 60% |

The Stycast epoxies are only representative of similar compounds available from other manufacturers. In most systems, the epoxy is preferred for its higher index of refraction which more nearly approaches that of CsI (about 1.80) and typically used silicon diodes (about 2.2).

Potting is preferably done in a jig which forms a front surface at the edge of the plate 51 to uniformly fill the trough including the scintillator centrally thereof so as to encompass the scintillator and couple it to the diode surfaces 62 and to the front face 56 of the bar 55. Not only is optical efficiency enhanced, but the scintillator itself is also physically protected from the environment. Potting of the detector in the manner described above significantly increases the strength of the individual cell assemblies. In effect, all of the elements are tied together by the potting compound, and that tends to reduce any localized stress. In effect, the potting tends to enhance the mechanical stability of the individual detector cells and thus of the resulting detector.

Further in practicing the invention, we prefer to retain light within that potted assembly until it reaches the diode, and that is accomplished by providing a reflective surface for the exterior of the potting means. To that end, the front face 83 and side face 84 of the cured potting material is coated with a smooth specular coating preferably of silver which prevents light rays from leaving the potting material and simply rereflects them inwardly until ultimately they reach the diode surface and cause the production of an electrical signal.

We claim as our invention:

1. In a reflective cavity scintillation detector for a CT scanner for receiving a swath of radiation from an x-ray source to create a plurality of detector readings, the detector having a plurality of cells each including a scintillator and diode means mounted on a reflective collimator plate to form a cell, the improvement comprising, means shielding a part of the detector from the swath of radiation, the diode means being so arranged on the reflective collimator plate as to be within the shielded part of the detector, optical potting means joining the scintillator to the diode means, thereby to enhance the coupling of the scintillator to the shielded diode means.

2. The improvement as set out in claim 1 further including a reflective coating on the optical potting means for enhancing the internal reflectivity of the optically potted scintillator and diode means, thereby to further enhance light transmission to the diode means.

3. The improvement as set out in claim 2 wherein the reflective coating is a silver coating deposited on the outside of the optical potting means.

* * * * *